P. DEMING.
TYPE-WRITING MACHINE.
No. 170,621. Patented Nov. 30, 1875.
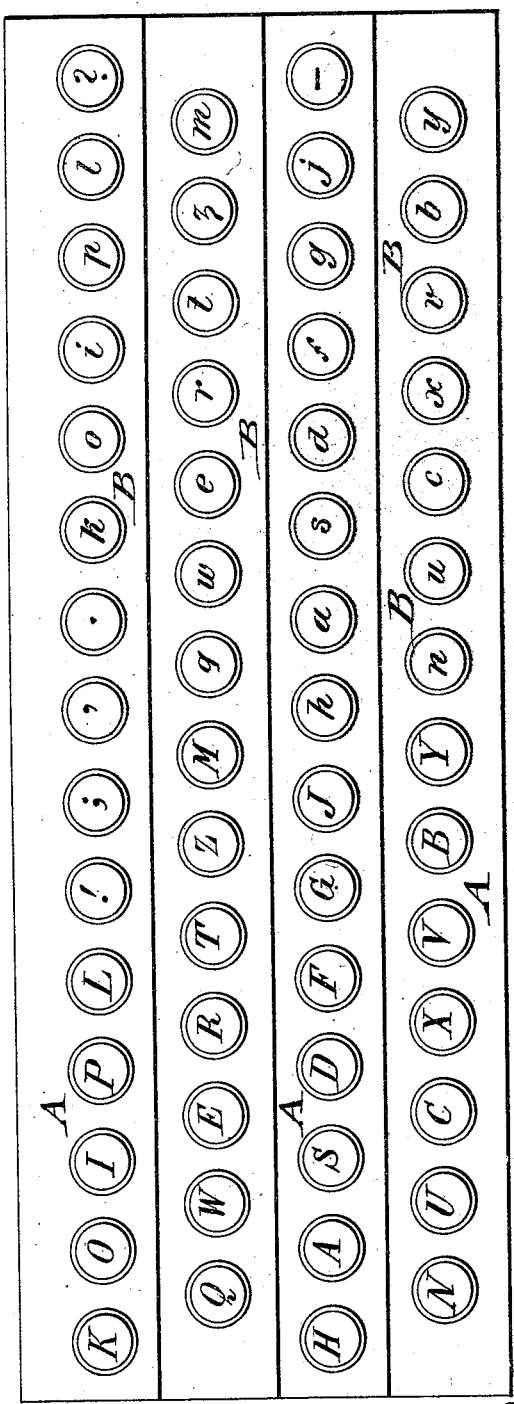
WITNESSES:
Chas. Nida
A. F. Terry
INVENTOR:
Philander Deming
BY
Munn
ATTORNEYS.

UNITED STATES PATENT OFFICE.

PHILANDER DEMING, OF ALBANY, NEW YORK.

IMPROVEMENT IN TYPE-WRITING MACHINES.

Specification forming part of Letters Patent No. 170,621, dated November 30, 1875; application filed May 22, 1875.

*To all whom it may concern:*

Be it known that I, PHILANDER DEMING, of Albany, in the county of Albany and State of New York, have invented a new and Improved Method of Stenotypic Reporting with Type-Writing Machines, of which the following is a specification:

The object of my invention is to so improve the various type-writers, which have come of late into more general use, that they may be made available for short-hand writing, and, therefore, the application of the same be greatly extended, and the stenotypic representation of words produced thereby be made use of directly by compositors for setting into type, or by others for other purposes, without the transcription required by the present stenographic systems.

The success of the type-writers which have been heretofore patented, and of late brought more extensively into use, is based on the fact that any writing made with the common English, or any long-hand alphabet, can be produced by them in shorter time than by copying by hand, it having been demonstrated by experience that, with average practice, the time required to represent the letters with the type-writer is, to the time required to do the same with the pen, in the ratio of two to three.

For expressing the essential elements of words in sentences, either with the pen in stenographic characters, or with the key-boards of the type-writers, about two impulses of the hand for each word are required, and the two impulses by the one mode take up about the same time as by the other.

To make the words legible, an average of two elements for each word—that is, two sounds, or two letters—must be represented, and to do this in stenographic or phonographic characters requires two impulses or movements of the hand, and the same is required to do it with the key-board in letters.

According to my invention the words printed by a type-writer are not spaced, but the initial letter of each word is different from the others composing it. This, together with the grouping of different capital and lower-case letters on the key-board, constitutes the gist of my invention.

The type-writers may, however, be effectually employed for short-hand reporting by dispensing with spacing, and suitably grouping different sets of lettered keys on the key-board.

My invention, therefore, consists, first, in printing each word with an initial letter different from the others composing it, such initial standing in lieu of a space to distinguish the beginnings of words; and the invention consists, secondly, in the manner of grouping the different sets of letters to admit of the most rapid manipulation of the keys, as hereinafter described.

A represents a series of keys, arranged with the letters of the alphabet, and one or more punctuation or other signs grouped at one side of the key-board, while B represents a second series of keys with the letters of an alphabet of different shape, being readily distinguishable from the former, grouped at the other side.

The keys of the group on the left may be made with capital letters, and those on the right with lower-case letters, or any other two alphabets of clearly-distinguishable character may be employed.

The group of keys on the left side is controlled usually by the left hand, and that on the right side by the right hand, the most-frequently used letters being arranged in front or middle, so as to be most convenient for the hands in working the key-board.

The alphabet on the left side is used for making the initials of the words, that on the right for making the remaining letters, in expressing the words stenotypically.

The type-writer may be worked with this key-board without spacing the words, as the difference between the initial letters and the remaining or finishing letters clearly indicates the separation of the words. The separation of the sentences may be indicated by punctuations. The time for spacing is thus fully gained by the mechanical indication of the words by different alphabets, rendering thus the type-writers available for short-hand writing, and furnishing at the same time the direct stenotypic representation of words, which may, with some practice, be read off directly without being transcribed, so as to be made use of by compositors, telegraphists, copyists, lawyers, and others, with a considerable saving of time and labor.

I am aware that capital and lower-case letters have heretofore been used together; but what I claim is—

1. The herein-described method of indicating the separate words written upon a typewriter, by substituting capital letters for the usual spacing, whereby the time usually consumed in spacing is saved, substantially as specified.

2. The combination and arrangement of the groups of lower-case-letter keys and the capital-letter keys in the key-board of a typewriter, as shown and described, for the purpose specified.

PHILANDER DEMING.

Witnesses:
    JAMES G. PATERSON,
    PAUL GOEPEL.